(12) United States Patent
Chen et al.

(10) Patent No.: US 7,347,222 B2
(45) Date of Patent: Mar. 25, 2008

(54) ENERGY ATTENUATION DEVICE

(75) Inventors: Yungrwei Chen, West Bloomfield, MI (US); Curtis William Schlak, Livingston County, MI (US)

(73) Assignee: Fluid Routing Solutions, Inc., Rochester Hills, MI (US)

( * ) Notice: Subject to any disclaimer, the term of this patent is extended or adjusted under 35 U.S.C. 154(b) by 0 days.

(21) Appl. No.: 11/739,346

(22) Filed: Apr. 24, 2007

(65) Prior Publication Data

US 2007/0204928 A1    Sep. 6, 2007

Related U.S. Application Data

(63) Continuation-in-part of application No. 11/347,207, filed on Feb. 3, 2006, now Pat. No. 7,249,613.

(51) Int. Cl.
*F16L 55/04* (2006.01)
(52) U.S. Cl. .................. 138/30; 138/26; 138/114; 181/225
(58) Field of Classification Search ............. 138/30, 138/26, 114; 181/225
See application file for complete search history.

(56) References Cited

U.S. PATENT DOCUMENTS

| | | | |
|---|---|---|---|
| 360,326 A | 3/1887 | Richert |
| 443,220 A | 12/1890 | Detrick |
| 593,726 A | 11/1897 | Nicholls |
| 752,175 A | 2/1904 | Monnier |
| 790,971 A | 5/1905 | Nicholls |
| 889,423 A | 6/1908 | Wood |
| 1,490,291 A | 4/1924 | Ross |
| 1,644,794 A | 10/1927 | Saharoff |
| 2,233,804 A | 3/1941 | Bourne |
| 2,330,564 A | 9/1943 | Dyer |
| 2,467,559 A | 4/1949 | Mahlberg |
| 2,562,101 A | 7/1951 | Hoyle |
| 2,630,833 A | 3/1953 | Ragsdale |
| 2,683,973 A | 7/1954 | Mettler |
| 2,684,692 A | 7/1954 | Hunter et al. |
| 2,712,831 A | 7/1955 | Day |
| 2,777,467 A | 1/1957 | Powell et al. |
| 2,858,854 A | 11/1958 | Daggett |
| 2,875,789 A | 3/1959 | Wright |
| 2,986,169 A | 5/1961 | McCormick |
| 3,016,503 A | 1/1962 | Pierce |
| RE25,384 E | 5/1963 | Bryant |
| 3,134,611 A | 5/1964 | Iverson |
| 3,164,174 A | 1/1965 | Berthod et al. |
| 3,215,164 A | 11/1965 | Szczepanski |
| 3,273,596 A | 9/1966 | Beckett |
| 3,276,478 A | 10/1966 | Bleasdale |
| 3,323,305 A | 6/1967 | Klees |
| 3,376,625 A | 4/1968 | McCulloch |
| 3,480,105 A | 11/1969 | Burris |

(Continued)

*Primary Examiner*—Patrick F. Brinson
(74) *Attorney, Agent, or Firm*—Joseph V. Tassone; Robert W. Becker & Associate

(57) ABSTRACT

An energy attenuation device for a conduit that is adapted to convey a pressurized fluid therethrough, comprising a hose section disposed about a portion of the conduit, wherein such conduit portion is made of flexible material and is provided with at least one aperture, for example in a surface thereof, and wherein in a non-pressurized state of the conduit, the hose section rests against the portion of the conduit over essentially the entire length of such portion.

20 Claims, 7 Drawing Sheets

U.S. PATENT DOCUMENTS

| | | |
|---|---|---|
| 3,527,258 A | 9/1970 | Farr |
| 3,532,125 A | 10/1970 | Everett et al. |
| 3,565,338 A | 2/1971 | Wright |
| 3,582,006 A | 6/1971 | Thompson |
| 3,610,289 A | 10/1971 | Moon |
| 3,842,940 A | 10/1974 | Bonikowski |
| 3,878,867 A | 4/1975 | Dirks |
| 3,889,717 A | 6/1975 | Obadal et al. |
| 3,908,788 A | 9/1975 | Hammarstedt |
| 3,933,172 A | 1/1976 | Allen |
| 3,934,824 A | 1/1976 | Fitzhugh |
| 4,043,539 A | 8/1977 | Gilmer et al. |
| 4,064,963 A | 12/1977 | Kaan et al. |
| 4,067,195 A | 1/1978 | Malecha |
| 4,116,303 A | 9/1978 | Trudell |
| 4,285,534 A | 8/1981 | Katayama et al. |
| 4,371,053 A | 2/1983 | Jones |
| 4,456,034 A | 6/1984 | Bixby |
| 4,489,759 A | 12/1984 | Yamamura |
| 4,501,341 A | 2/1985 | Jones |
| 4,514,141 A | 4/1985 | Marey |
| 4,611,633 A | 9/1986 | Buchholz et al. |
| 4,637,435 A | 1/1987 | Chirdon |
| 4,671,380 A | 6/1987 | Henderson et al. |
| 4,700,805 A | 10/1987 | Tanaka et al. |
| 4,737,153 A | 4/1988 | Shimamura et al. |
| 4,762,150 A | 8/1988 | Kokuryu |
| 4,784,648 A | 11/1988 | Singh et al. |
| 4,787,419 A | 11/1988 | Megee et al. |
| 4,794,955 A | 1/1989 | Ejima et al. |
| 4,828,068 A | 5/1989 | Wendler et al. |
| 4,880,078 A | 11/1989 | Inoue et al. |
| 4,979,441 A | 12/1990 | Welch et al. |
| 5,025,890 A | 6/1991 | Hisashige et al. |
| 5,094,271 A | 3/1992 | Fritz et al. |
| 5,168,855 A | 12/1992 | Stone |
| 5,172,729 A | 12/1992 | Vantellini |
| 5,201,343 A | 4/1993 | Zimmermann et al. |
| 5,367,131 A | 11/1994 | Bemel |
| 5,475,976 A | 12/1995 | Phillips |
| 5,495,711 A | 3/1996 | Kalkman et al. |
| 5,509,391 A | 4/1996 | DeGroot |
| 5,539,164 A | 7/1996 | van Ruiten |
| 5,582,006 A | 12/1996 | Phillips |
| 5,728,981 A | 3/1998 | van Ruiten |
| 5,779,355 A | 7/1998 | Pullman |
| 5,785,089 A | 7/1998 | Kuykendal et al. |
| 5,941,283 A | 8/1999 | Forte |
| 5,983,946 A | 11/1999 | Chen et al. |
| 6,073,656 A | 6/2000 | Chen et al. |
| 6,085,792 A | 7/2000 | Cooper et al. |
| 6,089,273 A | 7/2000 | Cooper et al. |
| 6,119,728 A | 9/2000 | Seidel-Peschmann et al. |
| 6,123,108 A | 9/2000 | Chen et al. |
| 6,125,890 A | 10/2000 | Cooper et al. |
| 6,131,613 A | 10/2000 | Jenski, Jr. et al. |
| 6,155,378 A | 12/2000 | Qatu et al. |
| 6,158,472 A | 12/2000 | Hilgert |
| 6,240,964 B1 | 6/2001 | Cooper et al. |
| 6,269,841 B1 | 8/2001 | Chen et al. |
| 6,279,613 B1 | 8/2001 | Chen et al. |
| 6,338,363 B1 | 1/2002 | Chen et al. |
| 6,360,777 B1 | 3/2002 | Bae |
| 6,478,053 B2 | 11/2002 | Zanardi |
| 7,017,610 B2 | 3/2006 | Zimpfer et al. |
| 2006/0130921 A1 | 6/2006 | Andres |

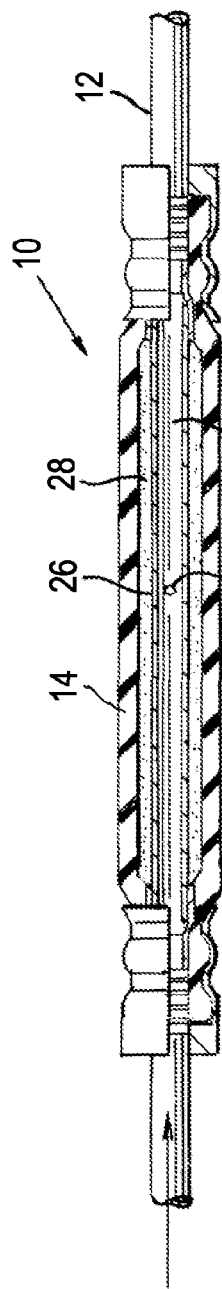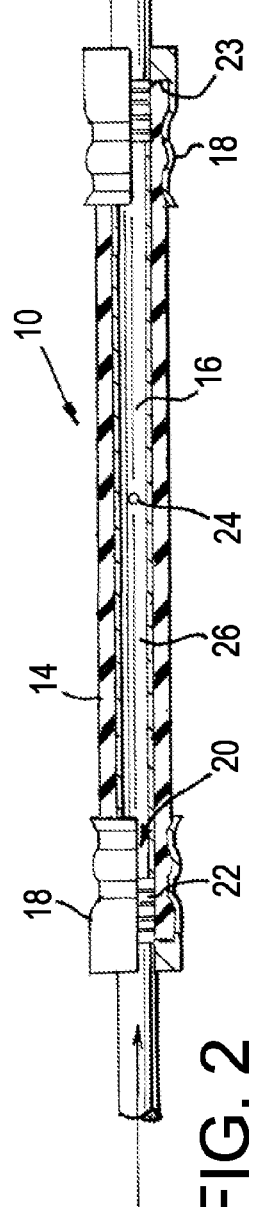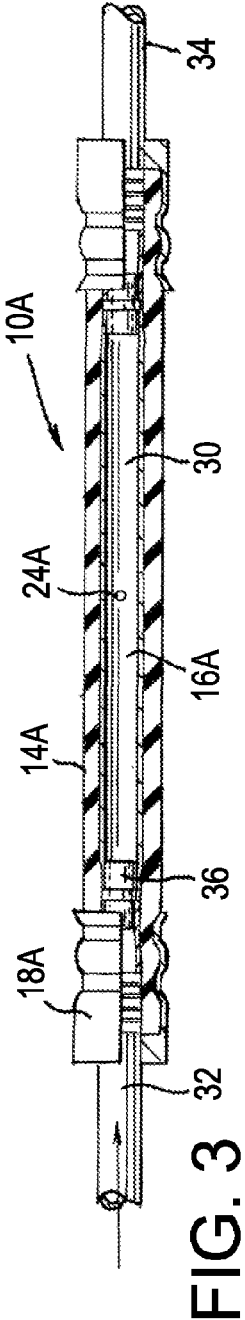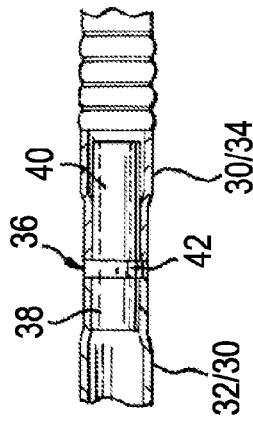
FIG. 2A
FIG. 2
FIG. 3
FIG. 4

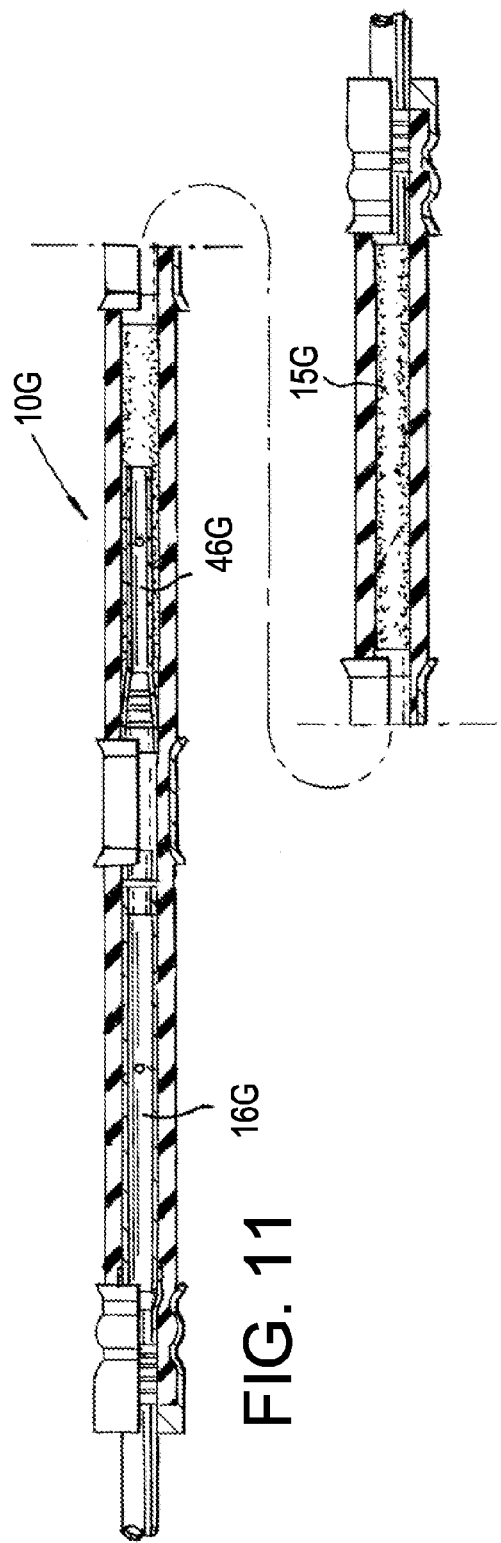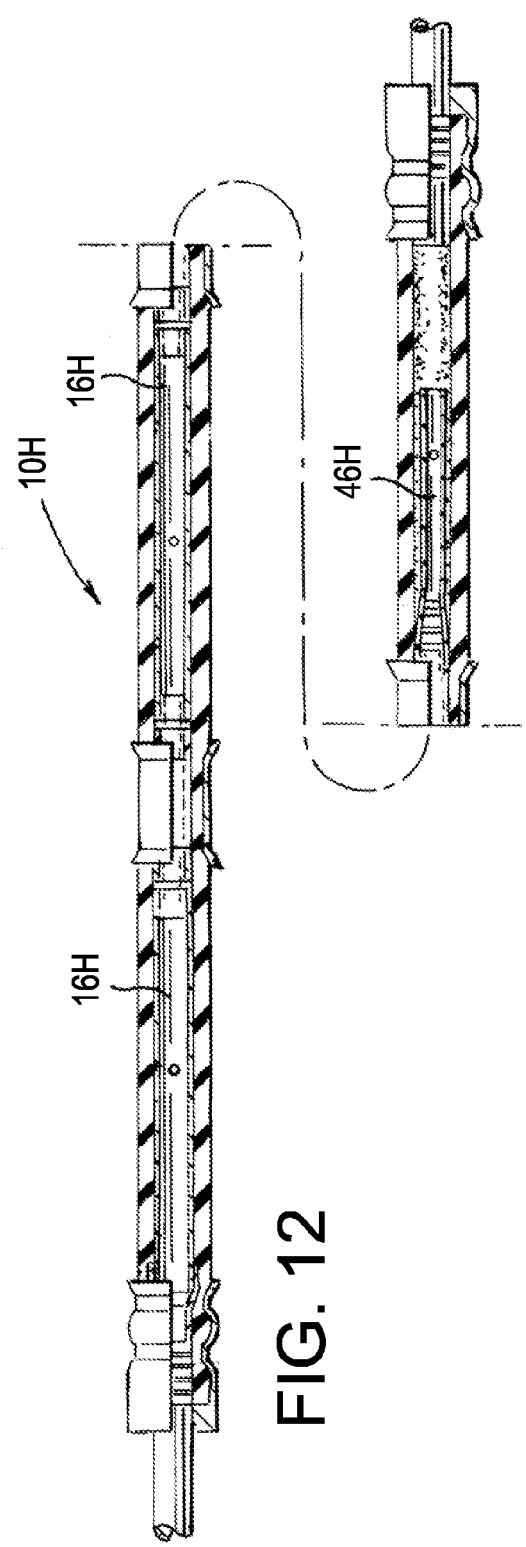

ENERGY ATTENUATION DEVICE

CROSS-REFERENCE TO RELATED APPLICATIONS

This application is a continuation-in-part of application Ser. No. 11/347,207 filed Feb. 3, 2006 now U.S. Pat. No. 7,249,613.

BACKGROUND OF THE INVENTION

1. Field of the Invention

This application relates to an energy attenuation device for a conduit that is adapted to convey a pressurized fluid therethrough. Such a device is particularly suitable for placement in such a conduit for the attenuation of pressure pulses in the fluid, especially in a hydraulic system of the power steering unit of a vehicle. The inventive device would also be suitable for other hydraulic fluids.

2. Prior Art Statement

In hydraulic systems where the operating liquid is circulated by a pump, the pulsations of pressure that are generated by the pump are transmitted through the conduits and result in noise and/or vibration being produced by the hydraulic liquid. In the case of power steering fluid in vehicles, such noise and/or vibration is caused, for example, when vehicles are being parked or unparked at idle or very low speeds of movement of the vehicle, such as by barely moving into and out of a parking space or the like while the wheels of the vehicle are being turned by the power steering mechanism thereof. In particular, substantial noise and/or vibration (shudder) can be produced in such a situation when the power steering fluid passes through the power steering mechanism from the fluid pump to the effective steering structure. Further background in this area can be obtained from U.S. Pat. No. 3,323,305, Klees, whereby this U.S. Patent is being incorporated into this disclosure by this reference thereto.

Energy attenuation devices are known where a tube is disposed in a hose. However, in all heretofore known energy attenuation devices, a defined annular space is required to be present between the outer surface of the tube and the inner surface of the hose.

SUMMARY OF THE INVENTION

It is therefore an object of the present application to provide a new device for attenuating energy in a conduit that conveys fluid under pressure.

This object is realized by an energy attenuation device that comprises a hose section that is disposed about a portion of the conduit, wherein such portion of the conduit is made of flexible material, such as flexible polymeric material or rubber, and is provided with at least one aperture, for example on the surface thereof, and wherein in a non-pressurized state of the conduit, the hose section rests against, i.e. touches, the portion of the conduit over essentially the entire length of such portion.

The critical aspect of the energy attenuation device of the present application is that when no fluid under pressure flows through the conduit, the outer hose section rests flushly against the inner conduit portion, in other words, in this non-pressurized state there is no annular space between the inner conduit portion and the outer hose section, as is the case with all prior known tube-type energy attenuation devices. When fluid under pressure flows through the conduit, fluid exits the aperture or apertures causing the hose section to expand to thereby provide noise attenuation.

BRIEF DESCRIPTION OF THE DRAWINGS

Other objects, uses and advantages of this invention are apparent from a reading of the specification in conjunction with the accompanying schematic drawings, which form a part thereof and wherein:

FIG. 2 is a cross-sectional view of one exemplary embodiment of an energy attenuation device of this application in a non-pressurized state;

FIG. 2a shows the energy attenuation device of FIG. 2 in a pressurized state; and FIGS. 3-13 are cross-sectional views of further exemplary embodiments of the energy attenuation device of the present application.

DESCRIPTION OF PREFERRED EMBODIMENTS

Figure 1:
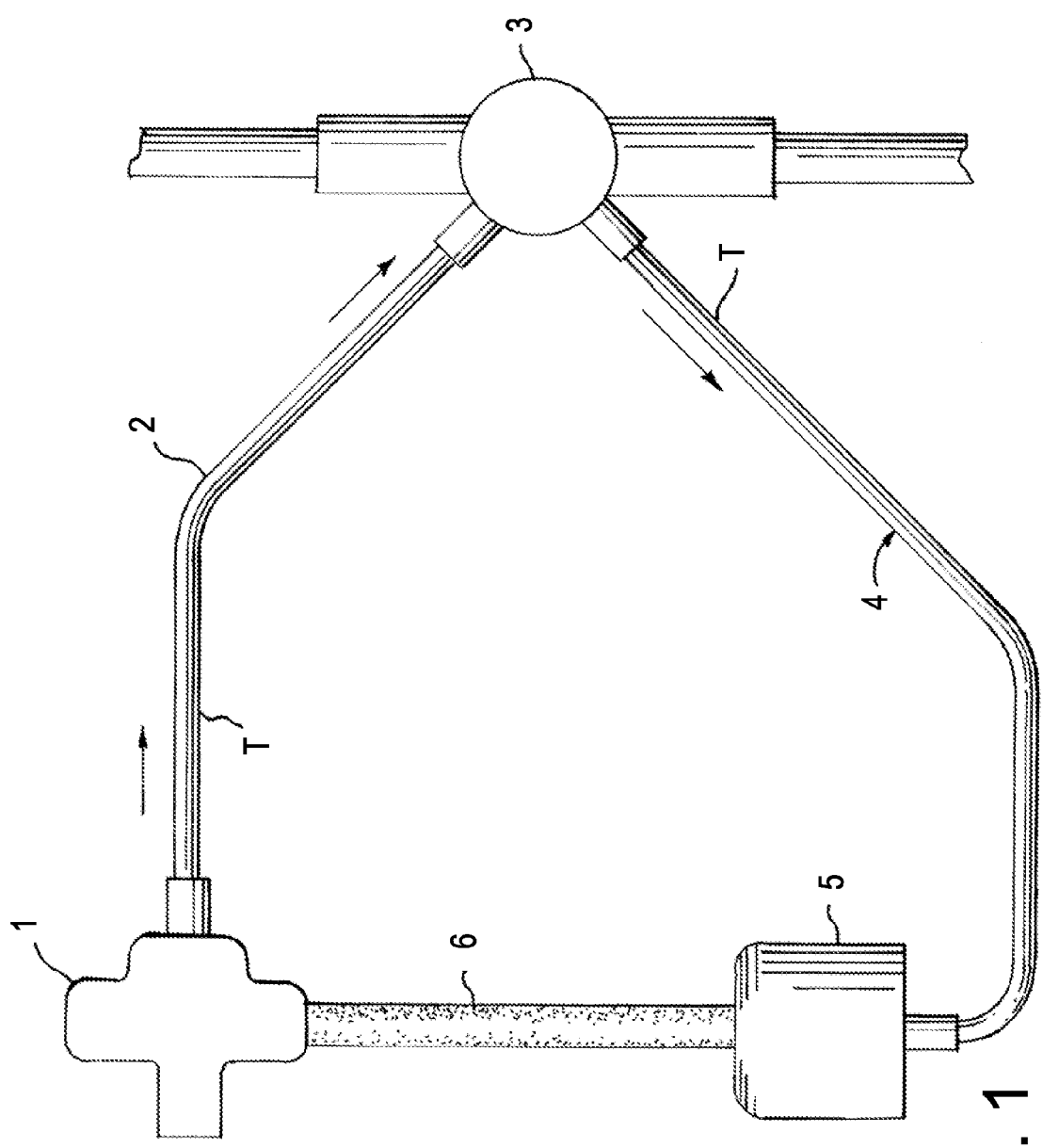
FIG. 1 illustrates a simplified automotive power steering system into which is to be incorporated an embodiment of the energy attenuation device of this application.

While the various features of this invention are hereinafter illustrated and described as providing a sound or energy attenuation device for an automotive power steering system, it is to be understood that the various features of this invention can be utilized singly or in various combinations thereof to provide an energy attenuation device for other systems that convey liquid, especially liquid under pressure.

Therefore, this invention is not to be limited to only the embodiments illustrated in the drawings, because the drawings are merely utilized to illustrate one of the wide variety of usages of this invention.

Referring now to the drawings in detail, FIG. 1 illustrates a simplified automotive power steering system. During operation, the power steering pump 1 generates pressure ripples that are transmitted through tubing T, such as steel or rigid polymeric tubing, as the pressure line 2, to the power steering gear 3, the return line 4, and the reservoir 5, and finally flow back to the pump 1 itself by means of the supply line 6. It should be noted that rather than being separated by a hose or similar conduit, the reservoir 5 and the pump 1 could actually be a single unit.

In order to greatly reduce noise, such as from resonance, for example in the pressure line 2 or in the return line 4, and thereby to eliminate or at least greatly reduce the power steering noise or vibration generated by the power steering pump 1 and/or the power steering gear 3, the energy attenuation device of this application is disposed either in the pressure line 2, between the steering pump 1 and the gear 3, or in the return line 4, between the gear 3 and the reservoir 5 or the pump 1. In addition, it would also be conceivable to dispose the energy attenuation device of the present application in both the pressure line 2 and the return line 4.

Various exemplary embodiments of the energy attenuation device of the present application, which is indicated generally by the reference numeral 10, and components and arrangements thereof, are illustrated in the drawings and will be described in detail subsequently.

FIG. 2 shows one exemplary embodiment of an inventive energy attenuation device 10 for a conduit 12 that is comparable to the tubing T and is adapted to convey a pressurized fluid therethrough. A hose section 14 is disposed about a portion 16 of the conduit 12 that extends from one coupling or sleeve 18 to another coupling or sleeve 18 that is disposed at the opposite end of the conduit portion 16. In particular, the hose section 14 extends from an area 20 below one of the sleeves 18 to the area 20 below the opposite sleeve 18. When no pressurized fluid is flowing through the conduit 12, the hose section 14 rests essentially flushly, i.e. directly, on the conduit portion 16 over the entire length thereof.

The sleeves 18 are provided in order to crimp the hose section 14 onto the conduit portion 16 to thereby provide a fluid-tight connection at that location. It should be noted that other suitable clamping means could also be provided. That part of the conduit portion 16 that is located below the sleeve 18 can be smooth or can be provided with a knurling 22 or other protrusions that are mechanically formed or applied to the conduit portion 16 to enhance a connection between the hose section 14 and the conduit portion 16, so as to prevent the hose section 14 from slipping on the conduit portion 16. In the illustrated embodiment, the hose section 14 extends from one shoulder 23 of the sleeve 18 at one end to the other shoulder 23 of the sleeve 18 provided at the opposite end of the conduit portion 16.

With regard to the reference to a "conduit portion" 16, in the embodiment illustrated in FIG. 2, the conduit 12 is actually a continuous tubing or conduit, with the conduit portion 16 being that portion of such continuous conduit that is disposed between the sleeves 18, or their shoulders 23, and on which is disposed the hose section 14.

For a purpose to be discussed in detail below, the conduit portion 16 is provided with at least one hole or aperture 24 in the peripheral surface 26 of the conduit portion 16. The aperture 24 has a fixed cross-sectional area, and provides communication to the interior of the conduit portion 16. Although the aperture 24 is shown as being centrally disposed, it could be disposed in other positions along the length of the conduit portion. In addition, where a plurality of apertures 24 are provided, they could be disposed in longitudinal and/or peripheral positions. Furthermore, although circular apertures are illustrated, any other shape could also be used.

In FIG. 2, the energy attenuation device 10 is illustrated in a non-pressurized state; FIG. 2a illustrates the situation when liquid under pressure is flowing through the conduit 12. Since the hose section 14 is made of elastomeric material, such as rubber, when liquid under pressure flows through the conduit 12, and enters the conduit portion 16, some of the liquid flows out of the aperture or apertures 24, causing the hose section 14 to expand and therefore be spaced from the surface 26 of the conduit portion 16. This escape of some of the liquid through the apertures 24 into the space 28 thereby formed between the hose section 14 and the conduit portion 16 provides attenuation of the noise resulting from the aforementioned pressure ripples that are transmitted through the conduit 12. When the pressure of the liquid in the conduit 12 is reduced, fluid returns to the conduit portion 16 from the space 28 through the apertures 24. When the system is entirely depressurized, the flexible hose section 14 once again rests essentially flushly against the surface 26 of the conduit portion 16. It should be noted that due to the fluid-tight connection formed between the hose section 14 and the conduit portion 16 by the sleeves 18, liquid that is present in the space 28 when the system is pressurized does not leak out.

Although in the embodiment illustrated in FIG. 2 the conduit 12 is a continuous tubing or conduit, it has been found according to the teachings of this application that other configurations are also possible. For example, separate conduit sections can be provided, and discrete conduit portions and/or hose sections can be interposed between the conduit sections and connected with at least one of them by appropriate couplings or adapters along with crimping sleeves or the like.

The embodiment of the energy attenuation device 10A illustrated in FIG. 3 differs from that shown in FIG. 2 in that the conduit portion 16A is in the form of a discrete conduit section 30 that is interposed between a first conduit section 32 and a second conduit section 34. The ends of the discrete conduit section 30 are connected to the first and second conduit sections 32 and 34 via appropriate connectors, couplings or adapters 36; an example of such an adapter 36 is shown in greater detail in FIG. 4. As can be seen, the adapter 36 is in the form of a tube, with a first part 38 thereof being inserted into the end of the first conduit section 32 or the discrete conduit section 30 as appropriate, while the second part 40 of the tubular adapter 36 is inserted into an end of the discrete conduit section 30 or the end of the second conduit section 34. If desired, the ends of the conduit sections into which the tubular adapter parts 38, 40 have been inserted can be pressed onto such parts as shown in FIG. 4; alternatively, the parts 38, 40 of the adapter 36 can merely be inserted into the conduit sections. In either case, an optional collar 42 can be provided on the adapter 36 to prevent the adapter parts 38, 40 from being inserted too far into their conduit sections. Rather than the tubular adapter parts 38, 40 being inserted into the conduit sections, the reverse situation can exist. In other words, the tubular adapter parts can have a larger diameter so that the conduit sections can be inserted therein.

Figure 5:
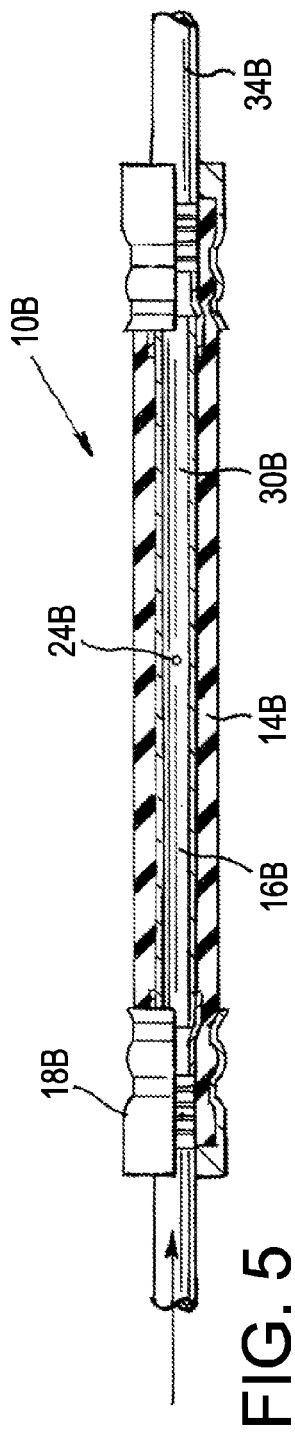
Figure 6:
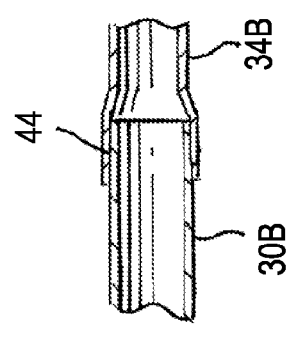

In the embodiment of the energy attenuation device 10B illustrated in FIG. 5, rather than providing an adapter between the conduit sections that are to be interconnected, these conduit sections are directly connected to one another, as can be seen more clearly from the enlarged view of FIG. 6. As can be seen from FIG. 6, the end 44 of the conduit section 34B is expanded somewhat to allow insertion of the conduit section 30B. The conduit section 30B can either be inserted loosely into the end 44 of the conduit section 34B, or such end 44 can be pressed onto the conduit section 30B.

Figure 7:
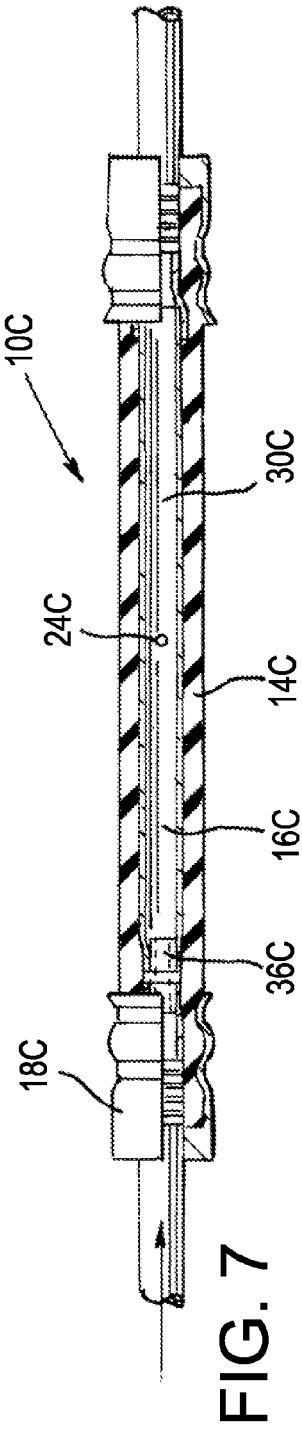

The embodiment of the energy attenuation device 10C illustrated in FIG. 7 is provided with different types of connections at each of the ends of the conduit section 30C. In particular, the right end of the conduit section 30C as viewed in FIG. 7 is provided with the type of connection illustrated in FIG. 6, whereas the left end of the conduit section 30C is provided with a connection in the form of the adapter 36 illustrated in FIG. 4. Of course, it is to be understood that these connections could be reversed, so that the adapter type of connection of FIG. 4 is on the right side of the conduit section 30C, and the expanded conduit section connection of FIG. 6 is on the left side of the conduit section 30C.

Although in the embodiments illustrated in FIGS. 3, 5 and 7, the discrete conduit section 30, 30B and 30C has been illustrated as extending from one sleeve to the other, such conduit section could also be a part of one of the conduit sections beyond the respective hose section 14A, 14B or 14C. For example, in FIG. 3, the conduit section 30 could be unitary with or a monolithic part of either the conduit section 32 or the conduit section 34, with the adapter or connection then being present only between the conduit section 30 on the one hand, and the conduit section 34 or 32 on the other hand.

Figure 8:
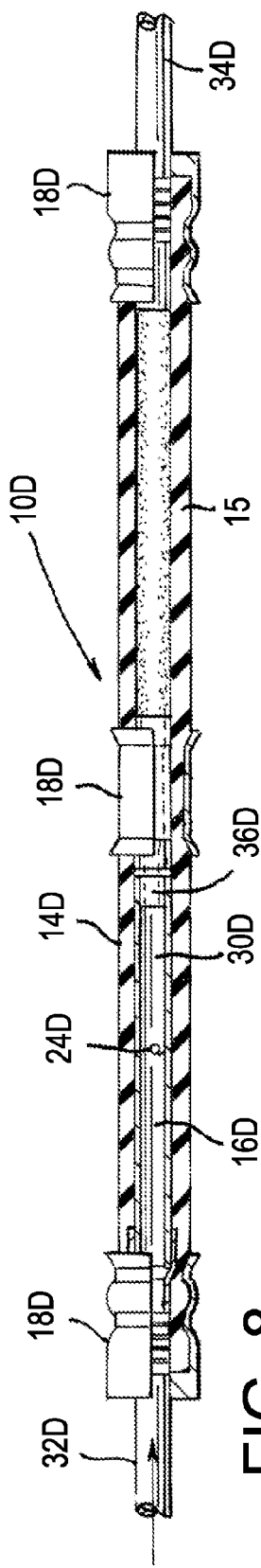
Figure 8A:
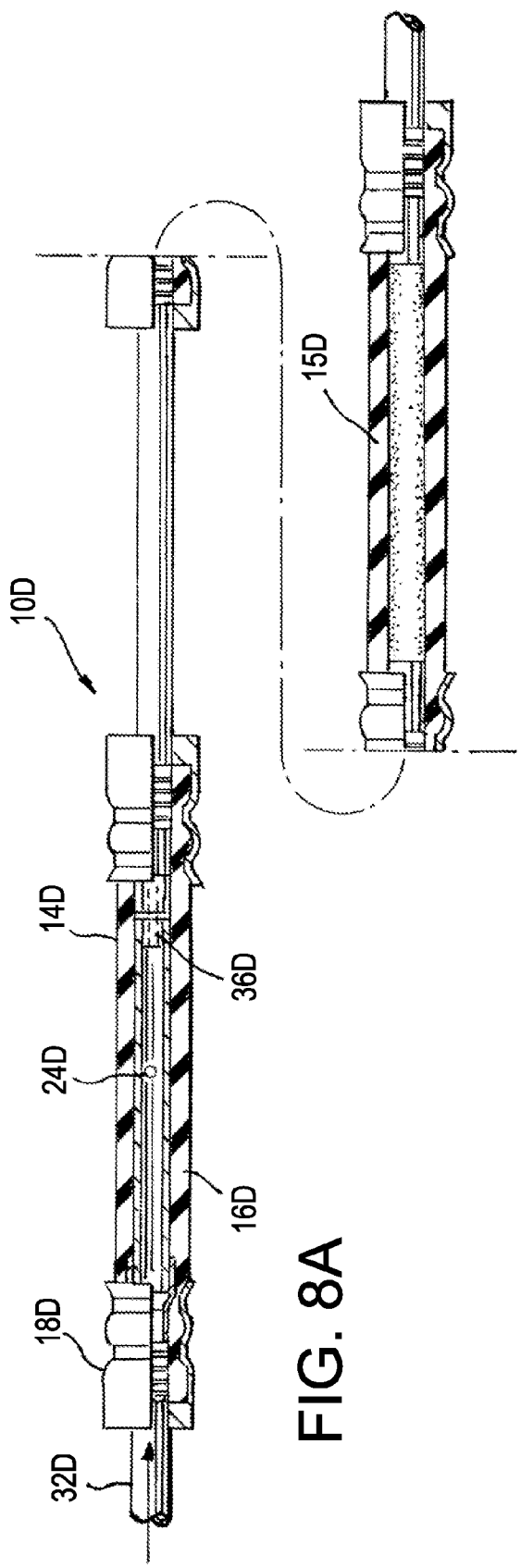

In the embodiment of the energy attenuation device 10D illustrated in FIG. 8, a further hose section 15 is disposed between the discrete conduit section 30D and the second conduit section 34D. The further hose section 15 is empty, in other words, it contains no conduit portion nor any other type of energy attenuation means. The further hose section 15 can be separate from the hose section 14D, or both hose sections can be a unitary or monolithic piece. If the hose sections are separate sections, they could even be further separated from one another by a length of conduit or tubing. By way of example, see FIG. 8a. At any rate, the various sleeves 18D connect the hose section or hose sections 14D, 15 to their respective conduit sections 32D, 30D and 34D.

Although in the embodiment illustrated in FIG. 8 a discrete conduit section 30D is shown, it would again also be possible for the conduit portion 16D to be a unitary part of the first conduit section 32D, with the latter then extending all the way to the connection or adapter 36D, or if no connection means is provided, all the way to the sleeve 18D that connects or crimps the hose sections 14D, 15 to the appropriate conduit portion. This applies to any of the embodiments where a discrete conduit section has been shown.

Also in this embodiment, although specific connection means have been illustrated, such as the adapter 36D and the expansion type connection means at the left side of the drawing, these connection means could be interchanged, only one type of connection means could be used, or if the conduit portion 16D is part of the first conduit section 32D no connection means would be required if the conduit portion 16D extends all the way to below the central sleeve 18D, which is shown as a so-called wedding band coupling.

Figure 9:
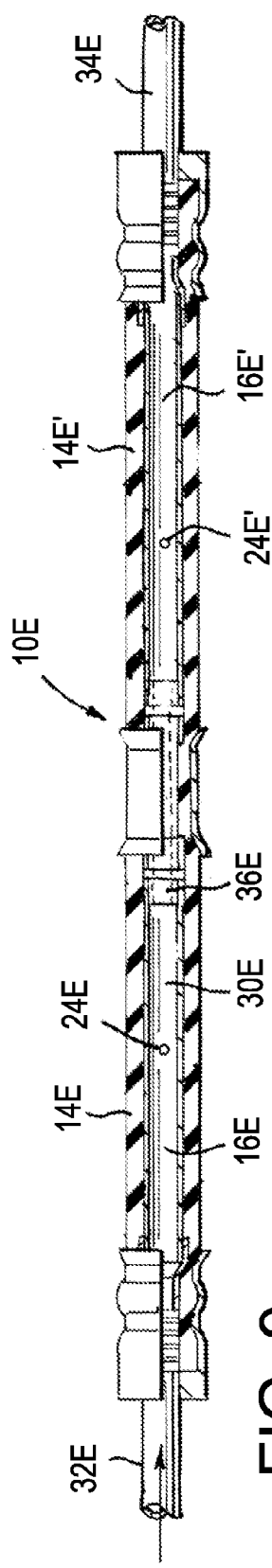

In the embodiment of the energy attenuation device 10E illustrated in FIG. 9, a second conduit portion 16E' is provided. A hose section 14E' is again disposed about the conduit portion 16E'. The hose sections 14E and 14E' can be separate sections, or they can be a monolithic piece. Similarly, the conduit portions 16E and 16E' can be a single section or discrete conduit sections, or they can be parts of the first conduit section 32E and/or the second conduit section 34E respectively. Again, various combinations of connection means can be provided, or connection means can be absent between the conduit portions 16E, 16E' and/or the first and second conduit sections 32E, 34E where the conduit portions 16E, 16E' are parts of such first and/or second conduit sections. In addition, the second conduit portion 16E' is again provided with one or more holes or apertures 24E'.

Figure 10:
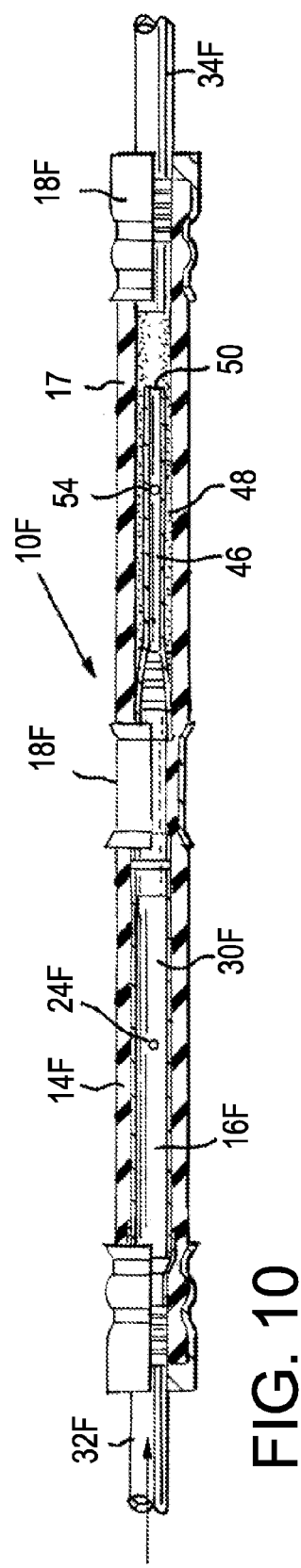

The embodiment of the energy attenuation device 10F illustrated in FIG. 10 differs from that shown in FIGS. 8 or 9 in that a second hose section 17 is provided in which is disposed an energy attenuation means in the form of a tuning cable 46, such as the apertured tubes shown in U.S. Pat. No. 6,338,363, the disclosure of which is incorporated herein by this reference thereto. The tuning cable is disposed in the hose section 17 such that an annular space 48 is defined between the outer peripheral surface of the tuning cable 46 and the inner peripheral surface of the hose section 17. This annular space 48 communicates with the rest of the interior space of the hose section 17 beyond the free end 50 of the tuning cable 46, since the tuning cable is not continuous, i.e. does not extend entirely from the central sleeve 18F all the way to the right hand sleeve 18F. Rather, there is a gap between the free end 50 of the tuning cable 46 and the right hand sleeve 18F. It should also be noted that instead of the arrangement shown, the tuning cable 46 could extend from the right hand sleeve 18F partly toward the central sleeve 18F. In addition, although the tuning cable 46 is shown with one or more surface apertures 54 in the surface thereof, rather than an aperture in the surface of the tuning cable, or in addition thereto, the end 50 of the tuning cable 46 could be open.

It should furthermore be noted that in contrast to the arrangements illustrated in FIGS. 8 and 10, the reverse arrangement of the hose sections and/or conduit portions or tuning cable could be provided.

The embodiment of the energy attenuation device 10G illustrated in FIG. 11 is a combination of the embodiments of FIGS. 8 and 10 to the extent that a first conduit portion 16G, a tuning cable 46G and a further, empty hose section 15G are provided. It is to be understood that these various components need not be provided in the sequence illustrated, but can be provided in any other sequence.

The embodiment of the energy attenuation device 10H illustrated in FIG. 12 is a combination of FIGS. 9 and 10 to the extent that two conduit portions 16H and one tuning cable 46H are provided. It is to be understood that again the sequence of components could be other than that shown. In addition, rather than two conduit portions 16H and one tuning cable 46H, one conduit portion 16H and two tuning cables 46H could be provided, or two conduit portions 16H and a further, empty hose section 15G could be provided. With regard to the embodiments of both FIGS. 11 and 12, again, various connection means can be provided, and not all of the conduit portions need be discrete conduit sections.

It is to be understood that one of skill in the art could readily provide various other combinations of the illustrated embodiments and still be within the scope of the present invention. For example, two empty hose sections 15G could be provided, and/or a situation similar to that shown in FIG. 8a could be present.

It should furthermore be noted that whereas the conduit 12 is generally a steel tubing, although it could also be made of polymeric material, such as tetrafluoroethylene fluorocarbon resins, fluorinated ethylenepropylene resins or polyamide, the discrete conduit sections, such as the conduit section 30 of FIG. 3, can be the same or a different material from that of the conduit 12, especially being made of a polymeric material.

Figure 13:
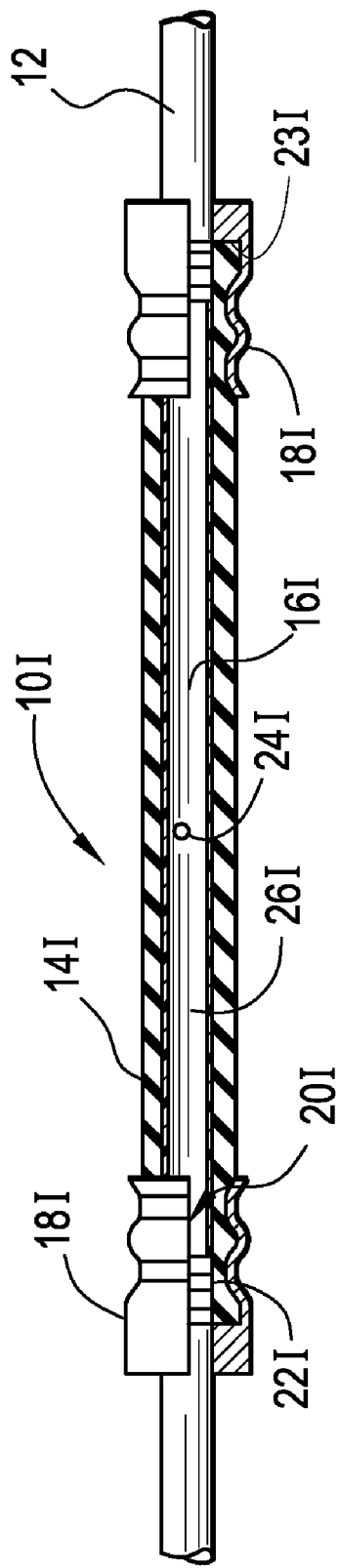

Whereas the conduit 12 and the conduit portion 16 are made of rigid material in the previously-described embodiments, being made, for example, of steel or rigid polymeric material, in the further embodiment of the energy attenuation device 10I illustrated in FIG. 13, the conduit portion 16I is made of flexible material, such as a flexible polymeric material, for example a tetrafluoroethylene fluorocarbon resin or a fluorinated ethylenepropylene resin, or rubber. In the context of the present application, the term flexible is used to mean that the conduit portion 16I, with the hose section 14I disposed thereabout, can be easily or freely bent, yet cannot collapse inwardly.

Again, as described in conjunction with the previous rigid conduit portion embodiments, rather than the conduit 12 being a continuous tubing or conduit, separate conduit sections can be provided, and discrete conduit portions and/or hose sections can be interposed between the conduit sections and connected with at least one of them by appropriate couplings, adapters or other appropriate connection means, including the tubular adapter 36 described in conjunction with FIG. 4, and the direct connection means described in conjunction with FIG. 6. In addition, due to the flexible nature of the conduit portion 16I of the embodiment of the energy attenuation device 10I, it would also be possible to merely push the conduit portion 16I over the tubing 12, an adapter 36, or other appropriate connection or coupling means. Furthermore, a connector and/or the conduit portion 16I can have an appropriate barbed configuration to enhance the coupling.

If a discrete conduit section of flexible material is provided, similar to the discrete conduit sections 30, 30B and 30C of FIGS. 3, 5 and 7, such a conduit section need not merely extend from one sleeve to the other, but could also be part of a conduit section beyond the respective hose section. Thus, the conduit section could be unitary with or a monolithic part of either a conduit section 32 or a conduit section 34 (see FIG. 3), with an adapter or other connection then being present only between the conduit section within the hose section on the one hand, and the conduit section 34 or 32 on the other hand.

Similar to the energy attenuation devices 10D to 10H illustrated in FIGS. 8-12, multiple chambers or hose sections could also be provided, with some of the chambers being empty and/or containing multiple conduit portions 16 or discrete conduit sections 30 of either rigid and/or flexible material. Some of the chambers could also include other types of energy attenuation devices, as shown and described in conjunction with the energy attenuation devices of FIGS. 10-12.

Providing at least one conduit portion 16I or a corresponding discrete conduit section made of flexible material makes it possible to more easily adapt the system to the space available, for example in an engine compartment. Thus, the conduit portions do not have to be pre-bent prior to installation into the engine compartment space.

Although in the illustrated embodiments the conduit portion 16 or discrete conduit section 30 has been shown as being a single and/or continuous component within its hose section 14, i.e. between the sleeves 18, it could also be a split or divided conduit portion, with the parts thereof being interconnected to the adapter 36 of FIG. 4 or any other suitable connection means, including the type of connection shown in FIG. 6. It should also be noted that the aperture 24 could be disposed in the connection means as well as in one or more of the conduit portion parts.

By way of example only, the conduit 12, as well as the various discrete conduit sections 30, can have an outer diameter of 0.95 cm (⅜ inch) or 1.27 cm (½ inch), while the hose sections 14, 15 in the non-pressurized state have an inner diameter that is the same as the outer diameter of the conduit 12. These diameters can of course also be smaller or larger. In addition, the apertures 24 can have a cross-sectional diameter of, for example, 0.32 cm (⅛ inch) or 0.64 cm (¼ inch), or any other suitable dimension.

Although straight conduits and hose sections have been illustrated, curved or bent configurations could also be utilized in order to conform to the installation space that is available, either via a pre-bent conduit portion, or by use of embodiments where the conduit portion is made of flexible material.

The present invention is, of course, in no way restricted to the specific disclosure of the specification and drawings, but also encompasses any modifications within the scope of the appended claims.

What is claimed is:

1. An energy attenuation device for a conduit that is adapted to convey a pressurized fluid therethrough, comprising:

a hose section disposed about a portion of said conduit, wherein an outer surface of said hose section is open to the environment, wherein said portion of said conduit is made of flexible material and is provided with at least one aperture, and wherein in a non-pressurized state of said conduit, said hose section rests against said portion of said conduit over essentially the entire length of said portion of said conduit, whereas in a pressurized state of said conduit, said hose section does not rest against the entire length of said portion of said conduit.

2. An energy attenuation device according to claim 1, wherein said conduit is a continuous tubing, and wherein said hose section is disposed about the portion thereof.

3. An energy attenuation device according to claim 1, wherein said at least one aperture is disposed on a surface of said portion of said conduit.

4. An energy attenuation device according to claim 1, wherein said portion of said conduit is a discrete conduit section that is coupled to at least one pertaining section of said conduit.

5. An energy attenuation device according to claim 1, wherein said hose section is fixed onto said portion of said conduit.

6. An energy attenuation device according to claim 5, wherein said hose section is fixed onto said portion of said conduit via sleeves that crimp said hose section against said portion of said conduit.

7. An energy attenuation device according to claim 6, wherein in a region of said sleeves, said portion of said conduit has a smooth surface or a knurled surface.

8. An energy attenuation device according to claim 1, wherein one end of said portion of said conduit is coupled directly to an end of a pertaining section of said conduit.

9. An energy attenuation device according to claim 1, wherein one end of said portion of said conduit is coupled to an end of a pertaining section of said conduit via an adapter or connection means.

10. An energy attenuation device according to claim 1, which further comprises a second portion of said conduit, wherein a further hose section is disposed about said second portion of said conduit, wherein said second portion of said conduit is rigid or flexible and is also provided with at least one aperture, and wherein in a non-pressurized state of said conduit, said further hose section also rests against said second portion of said conduit over essentially the entire length thereof.

11. An energy attenuation device according to claim 1, wherein said conduit comprises a first section and a second section, wherein said portion of said conduit is connected to or is part of one of said first and second conduit sections, wherein a further hose section connects said portion of said conduit to the other of said conduit sections in a fluid-conveying manner, and wherein said further hose section contains a further means for attenuating energy that extends only partially within said further hose section and has one end in fluid communication with said portion of said conduit or with the other of said conduit sections.

12. An energy attenuation device according to claim 11, wherein the other, free end of said further means for attenuating energy is open, or at least one aperture is provided on a peripheral surface of said further means for attenuating energy and said free end thereof is closed off or is open.

13. An energy attenuation device according to claim 1, wherein said conduit comprises a first section and a second section, wherein said portion of said conduit is connected to or is part of one of said first and second conduit sections, wherein a further hose section connects said portion of said conduit to the other of said conduit sections in a fluid-conveying manner, and wherein said further hose section contains no means for attenuating energy.

14. An energy attenuation device according to claim 10, which further comprises a third hose section that is disposed in series with said first and second portions of said conduit, wherein a further means for attenuating energy is disposed in said third hose section, or wherein said third hose section contains no means for attenuating energy.

15. An energy attenuation device according to claim 1, further comprising second and third hose sections, wherein all three hose sections are disposed in series between a first section and a second section of said conduit and are in fluid communication with one another.

16. An energy attenuation device according to claim 15, wherein a further means for attenuating energy is disposed in one of said second and third hose sections and the other of said third and second hose sections contains no means for attenuating energy, or wherein each of said second and third hose sections is provided with a further means for attenuating energy, and wherein said further means for attenuating energy respectively extend only partially within their hose section and have one end in fluid communication with one of the other hose sections or with said first section or said second section of said conduit.

17. An energy attenuation device according to claim 16, wherein the other, free end of said further means for attenuating energy is open, or at least one aperture is provided on a peripheral surface of said further means for attenuating energy and said free end thereof is closed off or is open.

18. An energy attenuation device according to claim 1, wherein said portion of said conduit is monolithically formed with a first section of said conduit and is coupled to a second section of said conduit.

19. An energy attenuation device according to claim 1, wherein said hose section is made of elastomeric material, and said flexible material of said portion of said conduit is flexible polymeric material or rubber.

20. A method of attenuating energy in a conduit that is adapted to convey a pressurized fluid there through, including the step of:

disposing a hose section about a portion of said conduit, wherein an outer surface of said hose section is open to the environment, wherein said portion of said conduit is made of flexible material and is provided with at least one aperture, and wherein in a non-pressurized state of said conduit, said hose section rests against said portion of said conduit over essentially the entire length of said portion, whereas in a pressurized state of said conduit, said hose section does not rest against the entire length of said portion of said conduit.

* * * * *